United States Patent Office 3,634,420
Patented Jan. 11, 1972

3,634,420
3(MORPHOLINOMETHYL)-2,3-DIHYDRO-CARBAZOL-4(1H)-ONES
Ruddy Littell, Rivervale, and George Rodger Allen, Jr., Old Tappan, N.J., assignors to American Cyanamid Company, Stamford, Conn.
No Drawing. Filed May 9, 1969, Ser. No. 823,513
Int. Cl. C07d 87/40
U.S. Cl. 260—247.5 R
2 Claims

ABSTRACT OF THE DISCLOSURE

The preparation of substituted amino alkylenetetrahydrocarbazoles by reacting a 2,3-dihydrocarbazolone with paraformaldehyde and an amine and subsequently subjecting the reaction product to reduction, is described. The products are useful for their central nervous system activity as tranquilizers.

SUMMARY OF THE INVENTION

This invention relates to novel substituted amino alkylenetetrahydrocarbazoles of the formula:

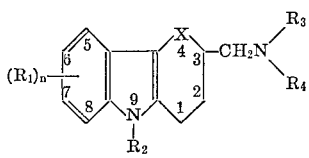

wherein $R_1$ is selected from the group consisting of hydrogen and lower alkoxy; $R_2$ is selected from the group consisting of hydrogen and lower alkyl; $R_3$ and $R_4$ are selected from the group consisting of lower alkyl, hydroxy lower alkyl, and lower alkenyl and $R_3$ and $R_4$ taken together with (nitrogen)

is selected from the group consisting of polymethyleneimino, morpholino, lower alkyl piperidino, phenyl piperidino, and mono-unsaturated polymethyleneimino, and X is a divalent radical selected from the group consisting of

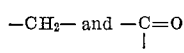

and $n$ is an integer from 1 to 2.

The compounds of this invention are, in general, crystalline solids having characteristic melting points and absorption spectra. They are appreciably soluble in many organic solvents such as lower alkanols, acetone, ethyl acetate, and the like. They are, however, generally insoluble in water. The compounds of this invention are organic bases; as such, they form acid addition salts with mineral acids and organic acids. These acid addition salts are also within the scope of the present invention.

The compounds of the present invention are preferably prepared as illustrated in the following flowsheet:

FLOWSHEET

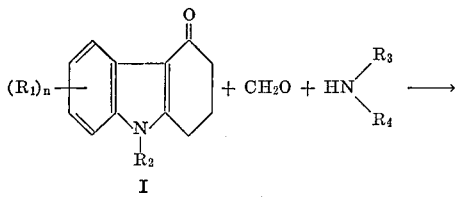

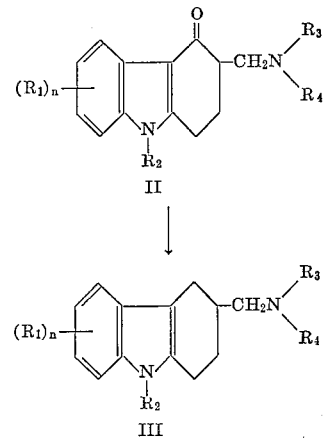

wherein $R_1$, $R_2$, $R_3$, $R_4$ and $n$ are as defined hereinbefore. In accordance with this reaction scheme, a 2,3-dihydro-4(1H)-carbazolone (I), is treated with paraformaldehyde and a secondary amine to give a 3-substituted aminomethyl-2,3-dihydro-4(1H)-carbazolone (II). The reaction may be conducted in a solvent such as methanol, ethanol, tetrahydrofuran, dioxane, and the like. Catalysis with mineral acids such as hydrogen chloride, hydrogen bromide and the like, is beneficial. The reaction is preferably conducted in tetrahydrofuran containing 5–10% of a hydroxylic solvent such as ethanol in the presence of hydrogen chloride. The amine utilized in this reaction may be selected from the group consisting of dimethylamine, diethylamine, dibutylamine, diethanolamine, pyrrolidine, piperidine, hexamethyleneimine, morpholine, 4-methylpiperidine, 2-methylpiperidine, 3-methylpiperidine, 4-phenylpiperidine, diallylamine, 3-pyrroline, 3-azabicyclo[3.2.2]nonane and the like. Reduction of the 3-substituted aminomethyl-2,3-dihydro-4(1H)-carbazolones (II) produces the 3-substituted aminomethyl - 1,2,3,4 - tetrahydrocarbazoles (III). This reduction is preferably carried out with diborane or lithium aluminum hydride in an aprotic solvent such as tetrahydrofuran, diethylene glycol dimethyl ether and the like.

The compounds of the present invention are physiologically active on the central nervous system. They show activity as tranquilizers at non-toxic doses. A useful test for tranquilizer activity consists of measuring the reduction of spontaneous motor activity in animals by means of an actophotometer (a photoelectric device for quantitatively measuring locomotor activity). Graded doses of the active compounds prepared by the process of this invention are administered to groups of mice, and the effective dosage range for a significant reduction of motor activity (a measure of tranquilization) compared to control groups is established. The use of reduced motor activity as a measure of tranquilizing activity has been described by W. D. Gray, A. C. Osterberg and C. E. Rauh, Archives Internationales et de Therapie, vol. 134, p. 198 (1961) and W. J. Kinnard and C. J. Carr, Journal of Pharmacology and Experimental Therapeutics, vol. 121, p. 354 (1957).

The following examples describe in greater detail the preparation of the novel substituted aminoalkylenetetrahydrocarbazoles of the present invention.

Example 1.—Preparation of 3-(diethylaminomethyl)-2,3-dihydrocarbazol-4(1H)-one

A solution of 600 mg. (3.15 mmoles) of 2,3-dihydrocarbazol-4(1H)-one [G. R. Clemo and D. G. I. Felton, J. Chem. Soc., 700 (1951)], 250 mg. (3.4 mmoles) of diethylamine, 0.3 ml. of 37% Formalin, 0.5 mml. of water and 3 ml. of glacial acetic acid is heated at 100° C. for two hours; 3 ml. of 6 N hydrochloric acid is added and heating is continued for 15 minutes. The solution is cooled and filtered to give recovered 2,3-dihydrocarbazol-4(1H)-one. The filtrate is extracted with ethyl acetate, and the aqueous solution is rendered alkaline to furnish 110 mg. of 3-(diethylaminomethyl)-2,3-dihydrocarbazol-4(1H)-one as a white powder. Crystallization from acetone-hexane gives white crystals, melting point 143°–145° C.

Example 2.—Preparation of 3-(dimethylaminomethyl)-2,3-dihydrocarbazol-4(1H)-one

A mixture of 1.00 g. (5.5 mmoles) of 2,3-dihydrocarbazol-4(1H)-one, 500 mg. (6.0 mmoles) of dimethylamine hydrochloride and 210 mg. (6.0 mmoles) of paraformaldehyde in 60 ml. of tetrahydrofuran is treated with 3 ml. of ethanolic hydrogen chloride and heated at reflux temperature for 1 hour. An additional 500 mg. (6.0 mmoles) of dimethylamine hydrochloride and 210 mg. (6.0 mmoles) of paraformaldehyde is added and heating is continued for 16 hours. The solution is evaporated and the residue is partitioned between ethyl acetate and 20% acetic acid. The acid layer is separated, washed with ether, and rendered alkaline with ammonium hydroxide to furnish 350 mg. of white powder. Crystallization from acetone-hexane gives 3-(dimethylaminomethyl)-2,3-dihydrocarbazol-4(1H)-one as white crystals, melting point 194°–196° C., dec.

Example 3.—Preparation of 3-(1-piperidinomethyl)-2,3-dihydrocarbazol-4(1H)-one

A mixture of 1.00 g. (5.5 mmoles) of 2,3-dihydrocarbazol-4(1H)-one, 210 mg. of paraformaldehyde and 510 mg. (6.0 mmoles) or piperidine in 100 ml. of tetrahydrofuran is treated with 5 ml. of ethanolic hydrogen chloride. When the procedure of Example 2 is followed, 550 mg. of 3-(1-piperidinomethyl) - 2,3 - dihydrocarbazol-4(1H)-one, is obtained. Crystallization from acetone-hexane affords white crystals, melting point 182°–184° C.

Example 4.—Preparation of 3-(morpholinomethyl)-2,3-dihydrocarbazol-4(1H)-one

A solution of 900 mg. of 2,3-dihydrocarbazol-4(1H)-one, 620 mg. of morpholine hydrochloride and 250 mg. of paraformaldehyde in 30 ml. of ethanol is heated at reflux temperature for 48 hours. After 6 hours an additional 620 mg. of morpholine hydrochloride and 250 mg. of paraformaldehyde is added. The solvent is removed and the residue is distributed between ethyl acetate and 6 N hydrochloric acid. The acid solution is washed with benzene, rendered alkaline with sodium hydroxide, and extracted with ethyl acetate. Evaporation of the solvent and crystallization of the residue from methanol gives 190 mg. of 3-(morpholinomethyl)-2,3-dihydrocarbazol-4(1H)-one as white crystals, melting point 216°–218° C.

Example 5.—Preparation of 2,3-dihydro-6,7-dimethoxy-9-methyl-3-(morpholinomethyl)carbazol-4(1H)-one A solution of 10.0 g. (72 mmoles) of 2-methoxy-1,4-benzoquinone and 7.0 g. (63 mmoles) of 3-aminocyclohex-2-enone in 80 ml. of ethanol is heated at reflux temperature for 3 hours, cooled, and filtered to give 6.50 g. of 2,3-dihydro-6-hydroxy-7-methoxycarbazol-4(1H)-one, melting point 293–295° C.

A solution of 1.70 g. (7.4 mmoles) of 2,3-dihydro-6-hydroxy-7-methoxycarbazol-4(1H)-one, prepared as described above, and 2.0 ml. (23 mmoles) of methyl sulfate in 200 ml. of acetone containing 4.0 of potassium carbonate is heated at reflux temperature for 16 hours. The mixture is filtered, and the filtrate is concentrated to give 1.20 g. of 2,3-dihydro-6,7-dimethoxy-9-methylcarbazol-4(1H)-one as needles, melting point 241°–245° C.

A solution of 600 mg. (2.3 mmoles) of 2,3-dihydro-6,7-dimethoxy-9-methylcarbazol-4(1H)-one, prepared as described above, 3.10 mg. (2.5 mmoles) of morpholine hydrochloride and 120 mg. of paraformaldehyde in 15 ml. of ethanol is heated at reflux temperature for 22 hours. After 6 hours an additional 155 mg. of morpholine hydrochloride and 60 mg. of paraformaldehyde is added. The solution is concentrated, chilled, and filtered. The filtrate is washed with ether, rendered alkaline with ammonium hydroxide and filtered to give 155 mg. of 2,3-hydro-6,7-dimethoxy-9-methyl - 3 - (morpholinomethyl) carbazol-4(1H)-one as long needles, melting point 215°–217° C.

Example 6.—Preparation of 1,2,3,4-tetrahydro-3-morpholinomethylcarbazole

To a solution of 568 mg. (2.0 mmoles) of 2,3-dihydro-3-morpholinomethyl-4(1H)-carbazolone in 30 ml. of tetrahydrofuran is added 10 ml. of 1 M borane in tetrahydrofuran solution, and the resulting solution is heated at reflux temperature for 2.5 hours. The solution is cooled, water is cautiously added, and the resulting mixture is evaporated. The residue is treated with a solution of 1.0 g. of potassium hydroxide in 20 ml. of methanol at reflux temperature for 18 hours. The solvent is removed, and the residue is distributed between water and ethyl acetate. The organic phase is evaporated to give 230 mg. of white solid. A sample purified by sublimation has melting point 142°–144° C.

Example 7.—Preparation of 3-(4-phenyl-1-piperidinomethyl)-2,3-dihydrocarbazol-4-(1H)-one A mixture of 1.00 g. (5.5 mmoles) of 2,3-dihydrocarbazol-4(1H)-one, 210 mg. of paraformaldehyde and 966 mg. (6.0 mmoles) of 4-phenylpiperidine in 100 ml. of tetrahydrofuran is treated with 5 ml. of ethanolic hydrogen chloride. When the procedure of Example 2 is followed, 3-(4-phenyl-1-piperidinomethyl) - 2,3 - dihydrocarbazol-4(1H)-one, is obtained.

Example 8.—Preparation of 3-(3-pyrrolin-1-ylmethyl)-2,3-dihydrocarbazol-4-(1H)-one A mixture of 3.7 g. (20 mmoles) of 2,3-dihydrocarbazol-4-(1H)-one, 900 mg. of paraformaldehyde and 1.8 g. (25 mmoles) of 3-pyrroline in 200 ml. of tetrahydrofuran is treated with 20 ml. of ethanolic hydrogen chloride. When the procedure of Example 2 is followed, 3-(3-pyrrolin-1-ylmethyl) - 2,3 - dihydrocarbazol-4(1H)-one, is obtained. Crystallization from acetone gives white crystals, melting point 180°–183° C.

Example 9.—Preparation of 3-(4-methyl-1-piperidinomethyl)-2,3-dihydrocarbazol-4(1H)-one A mixture of 3.00 g. (15.5 mmoles) of 2,3-dihydrocarbazol-4(1H)-one, 630 mg. of paraformaldehyde and 1782 mg. (18.0 mmoles) of 4-methylpiperidine in 300 ml. of tetrahydrofuran is treated with 15 ml. of ethanolic hydrogen chloride. When the procedure of Example 2 is followed, 3 - (4-methyl-1-piperidinomethyl)-2,3-dihydrocarbazol-4(1H)-one, is obtained.

Example 10.—Preparation of 3-(3-methyl-1-piperidinomethyl)-2,3-dihydrocarbazol-4(1H)-one A mixture of 1.00 g. (5.5 mmoles) of 2,3-dihydrocarbazol-4(1H)-one, 210 mg. of paraformaldehyde and 594 mg. (6.0 mmoles) of 3-methylpiperidine in 100 ml. of tetrahydrofuran is treated with 5 ml. of ethanolic hydrogen chloride. Using the procedure of Example 2, 3-(3-methyl - 1 - piperidinomethyl) - 2,3-dihydrocarbazol-4(1H)-one, is obtained.

Example 11.—Preparation of 1,2,3,4-tetrahydro-3-morpholinomethylcarbazole

To a solution of 852 mg. (3.0 mmoles) of 2,3-dihydro-3-morpholinomethyl-4(1H)-carbazolone in 100 ml. of tetrahydrofuran is added 380 mg. (10 mmoles) of lithium aluminum hydride. The mixture is heated at reflux temperature for 3 hours and then allowed to cool to room temperature. Dilute sodium hydroxide solution is cautiously added, and the resulting mixture is filtered. The residue is washed with ethyl acetate, and the organic phase is separated from the combined filtrate and washings. The organic solution is washed with water, dried and evaporated to give the product as a white solid, melting point 141°–143° C.

Example 12.—Preparation of 3 - (2-methyl-1-piperidinomethyl)-2,3-dihydrocarbazol-4(1H)-one A mixture of 2.00 g. (11.0 mmoles) of 2,3-dihydrocarbazol-4(1H)-one, 420 mg. of paraformaldehyde and 1188 mg. (12.0 mmoles) of 2-methylpiperidine in 200 ml. of tetrahydrofuran is treated with 10 ml. of ethanolic hydrogen chloride. When the procedure of Example 2 is followed, 3 - (2-methyl-1-piperidinomethyl)-2,3-dihydrocarbazol-4(1H)-one, is obtained.

Example 13.—Preparation of 3-(1-hexamethyleneiminomethyl)-2,3-dihydrocarbazol-4(1H)-one A mixture of 5.0 g. (25.5 mmoles) of 2,3-dihydrocarbazol-4(1H)-one, 1050 mg. of paraformaldehyde and 2970 mg. (30.0 mmoles) af hexamethyleneimine in 500 ml. of tetrahydrofuran is treated with 25 ml. of ethanolic hydrogen chloride. Using the procedure of Example 2, 3-(1-hexamethyleneimino) - 2,3 - dihydrocarbazol-4(1H)-one, is obtained.

Example 14.—Preparation of 3-(1-pyrrolidinomethyl)-2,3-dihydrocarbazol-4(1H)-one A mixture of 1.00 g. (5.5 mmoles) of 2,3-dihydrocarbazol-4(1H)-one, 210 mg. of paraformaldehyde and 426 mg. (6.0 mmoles) of pyrrolidine in 100 ml. of tetrahydrofuran is treated with 5 ml. of ethanolic hydrogen chloride. When the procedure of Example 2 is followed, 3-(1-pyrrolidinomethyl) - 2,3-dihydrocarbazol-4(1H)-one is obtained.

Example 15.—Preparation of 3-(diethanolaminomethyl)-2,3-dihydrocarbazol-4(1H)-one A mixture of 4.00 g. (22.0 mmoles) of 2,3-dihydrocarbazol-4(1H)-one, 840 mg. of paraformaldehyde and 2520 mg. (24.0 mmoles) of diethanolamine in 400 ml. of tetrahydrofuran is treated with 20 ml. of ethanolic hydrogen chloride. Using the procedure of Example 2, 3-(diethanolaminomethyl) - 2,3 - dihydracarbazol-4(1H)-one, is obtained.

Example 16.—Preparation of 3-(diallylaminomethyl)-2,3-dihydrocarbazol-4(1H)-one

A mixture of 1.5 g. (8.25 mmoles) of 2,3-dihydrocarbazol-4(1H)-one, 315 mg. of paraformaldehyde and 870 mg. (9.0 mmoles) of diallylamine in 150 ml. of tetrahydrofuran is treated with 8 ml. of ethanolic hydrogen chloride. When the procedure of Example 2 is followed, 3 - (diallylaminomethyl)-2,3-dihydrocarbazol-4(1H)-one, is obtained.

Example 17.—Preparation of 1,2,3,4-tetrahydro-3-piperidinomethylcarbazole

A solution of 564 mg. (2.0 mmoles) of 2,3-dihydro-3-piperidinomethyl-4(1H)-carbazolone in 25 ml. of tetrahydrofuran is treated with 10 ml. of 1 M borane in tetrahydrofuran solution. When the procedure of Example 6 is followed, 1,2,3,4 - tetrahydro-3-piperidinomethylcarbazole results.

Example 18.—Preparation of 3-(3-azabicyclo[3.2.2]nonylmethyl)-2,3-dihydrocarbazol-4(1H)-one A mixture of 1.00 g. (5.5 mmoles) of 2,3-dihydrocarbazol-4(1H)-one, 210 mg. of paraformaldehyde and 750 mg. (6.0 mmoles) of 3-azabicyclo-[3.2.2]-nonane in 100 ml. of tetrahydrofuran is treated with 5 ml. of ethanolic hydrogen chloride. When the procedure of Example 2 is followed, 3-(3-azabicyclo[3.2.2]nonylmethyl)-2,3-dihydrocarbazol-4(1H)-one, is obtained.

Example 19.—Preparation of 2,3-dihydro-6-methoxy-(3-morpholinomethylcarbazol-4(1H)-one A solution of 1.16 g. (6.6 mmoles) of 2-trifluoromethyl-1,4-benzoquinone and 666 mg. (6.0 mmoles) of 3-amino-2-cyclohexene-1-one in 10 ml. of acetic acid is heated at reflux temperature for 4 hours. The cooled solution is filtered to give 5,6,7,8-tetrahydro-3-hydroxy-5-keto-4-carbazolecarboxylic acid as crystals, melting point 324°–326° C., dec.

A mixture of 3.50 g. of 5,6,7,8-tetrahydro-3-hydroxy-5-keto-4-carbazolecarboxylic acid, prepared as described above, 80 ml. of 37% hydrochloric acid solution and 50 ml. of water is heated at reflux temperature for 4 hours. The resulting solution is neutralized with potassium hydroxide, and filtration affords 2,3-dihydro-6-hydroxycarbazol-4(1H)-one.

A mixture of 2.01 g. of 6-hydroxy-2,3-dihydrocarbazol-4(1H)-one, prepared as described above, 1.26 g. of methyl sulfate and 2.0 g. of potassium carbonate in 50 ml. of acetone is stirred at reflux temperature for 6 hours. The mixture is filtered, and the residue is washed with acetone. The combined filtrate and washings are evaporated, and the residue is distributed between ethyl acetate and water. The dried organic solution is evaporated to give 2,3-dihydro-6-methoxycarbazol-4(1H)-one.

A mixture of 1.20 g. (5.5 mmoles) of 2,3-dihydro-6-methoxycarbazol-4(1H)-one, prepared as described above, 210 mg. of paraformaldehyde and 512 mg. (6.0 mmoles) of morpholine in 100 ml. of tetrahydrofuran is treated with 10 ml. of ethanolic hydrogen chloride. When the procedure of Example 2 is followed, 2,3-dihydro-6-methoxy-3-morpholinomethylcarbazole-4(1H)-one results.

We claim:
1. A compound of the formula:

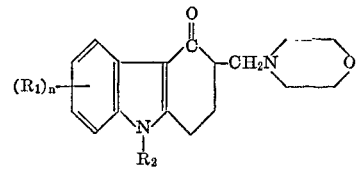

wherein $R_1$ is selected from the group consisting of hydrogen and methoxy; $R_2$ is selected from the group consisting of hydrogen and methyl and $n$ is an integer from 1 to 2.

2. The compound 3 - (morpholinomethyl)2,3-dihydrocarbazol-4(1H)-one.

References Cited

Shoen et al.: Chemical Abstracts, vol. 69, p. 51999 q (1968).

ALEX MAZEL, Primary Examiner

J. TOVAR, Assistant Examiner

U.S. Cl. X.R.

260—293 A, 293 D, 294.7 C, 315; 424—248